April 30, 1940. J. T. EARLE 2,199,306
TRUCKING DEVICE AND DETACHABLE RACK THEREFOR
Filed Oct. 30, 1939
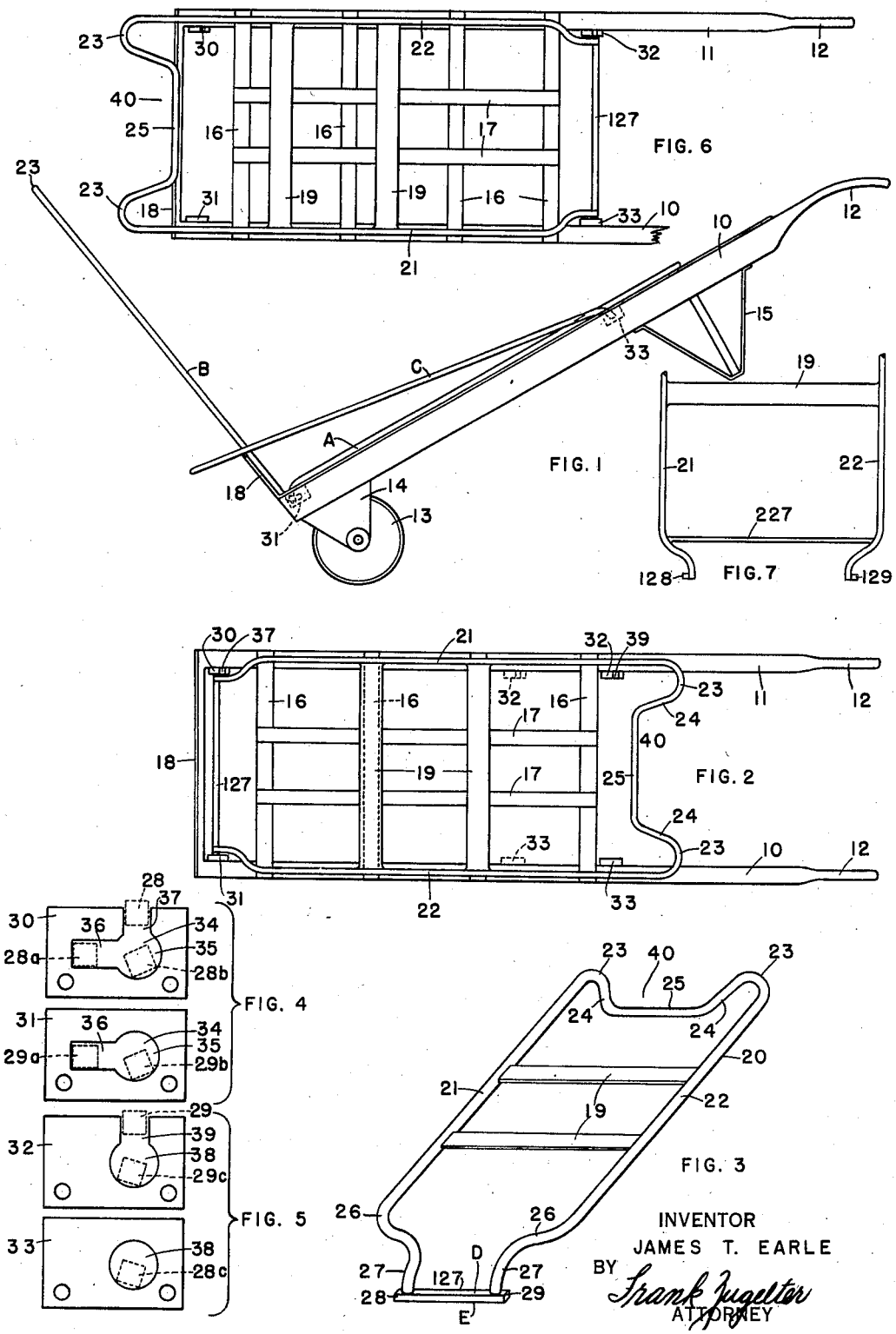
INVENTOR
JAMES T. EARLE
BY Frank Jugelter
ATTORNEY Patented Apr. 30, 1940

2,199,306

UNITED STATES PATENT OFFICE 2,199,306

TRUCKING DEVICE AND DETACHABLE RACK THEREFOR

James T. Earle, Cincinnati, Ohio

Application October 30, 1939, Serial No. 301,973

3 Claims. (Cl. 280—51)

This invention relates to trucks and more particularly to that class of trucks known as warehouse trucks.

An object of the present invention is to provide a novel type of removable rack for a warehouse truck, or the like, which may be disposed in various operative positions for augmenting the load carrying capacity of the truck.

Another object of the invention is to provide in a trucking device improved coupling means disposed on the inner sides of the side rails comprising the device, and a rack having complementary coupling means, for providing a truck and rack assembly, no part of which extends, projects or overhangs the side rails of the truck body.

A further object of the invention is to provide a reversible rack for trucking devices, or the like, which may be quickly and easily associated with or removed from a trucking device.

Still a further object of the invention is to provide a rack and a trucking device embodying improved coupling means for precluding accidental uncoupling or displacement of said rack from said truck.

Another object of the invention is to provide a rack and a trucking device embodying improved coupling means for locking the rack in certain inoperative positions upon the truck.

Another object of the invention is to provide a rack of the character stated, the frame of which may be fabricated from a single length of metallic rod whereby the cost of construction is lessened and the process of manufacture simplified.

Another object of the invention is to provide a rack of the character stated, having improved coupling means disposed at one end thereof and having a recessed portion provided in the opposite end into which long unwieldy articles, such as pipes, rods and the like, may be placed when such articles are disposed on top of other articles on the bed of the truck, to prevent them from falling off while being transported.

These and other objects are attained by the means described herein and disclosed in the accompanying drawing, in which:

Fig. 1 is a side elevational view of one well known type of trucking device embodying the present invention and showing the rack thereof in each of three operative positions.

Fig. 2 is a top plan view of the device shown in Fig. 1, showing the rack in the lowered or inoperative position A of Fig. 1.

Fig. 3 is a perspective view of the rack embodying the present invention.

Fig. 4 is a side elevational view of the front or forward pair of truck rail coupling members comprising a detail of the invention.

Fig. 5 is a side elevational view of the rear pair of truck rail coupling members comprising a detail of the invention.

Fig. 6 is a top plan view of the device shown in Fig. 1, showing the rack in the reversed position C of Fig. 1.

Fig. 7 is a top plan view of the forward end of a rack provided with a modified form of anchorage means.

It is highly desirable when transporting freight or other merchandise by means of the so-called hand or warehouse trucks, to be able to move as great a bulk or quantity of merchandise per trip as may be conveniently handled by the truck operator. To this end the carrying capacity of such trucks have in the past been augmented by providing various means to increase the effectiveness of the standard relatively short lifting blades with which such devices are provided, such as the racks disclosed in the patents to J. T. Earle et al. Nos. 1,945,969 and 1,948,206, and in the patent to J. T. Earle No. 2,113,174.

The present invention is directed to certain specific improvements in the rack structure, coupling means, and in the method and manner of securing the rack to the truck frame, as hereinafter more fully set forth.

With reference to the accompanying drawing, the numerals 10 and 11 indicate the opposed side rails of one widely used type of warehouse trucking device having handles 12 and wheels 13 provided at opposite ends thereof. Each wheel may be mounted to the forward end of a side rail by means of a bracket such as 14, and the rear portion of each rail may be provided with a suitable support member such as 15. Side rails 10 and 11 may be fixed in spaced relationship by means of transverse spacer elements 16, the opposite ends of which may be bolted or otherwise securely anchored to said rails. One or more longitudinal straps 17 may be riveted, welded or otherwise secured to the spacer elements 16, as shown. As is customary, a blade or lifter member 18 is provided transversely of the front or forward ends of side rails 10 and 11, being inclined forwardly and upwardly at an obtuse angle to said rail members.

A rack 20 is adapted to be pivotally secured to the front or rear portion of the truck whereby to assume any of the operative positions illustrated in Fig. 1.

In the preferred embodiment of the invention rack 20 comprises a one-piece U-shaped unitary frame bent from a single piece of round stock. The rack comprises a pair of substantially parallel side elements 21 and 22, the rear ends of each of which terminate in an inturned loop 23. The inner or adjacent legs 24 of each loop 23 are interconnected by transverse end element 25 which is disposed at substantial right angles with side elements 21 and 22. It should be observed that a U-shaped channel or recess 40 is thus provided across the rear end of rack 20, disposed in the plane of the side elements as shown in Fig. 3. The opposite end of each side element is bent inwardly towards the other as at 26, and then downwardly out of the mean plane of the rack, as at 27. A bar 127, preferably of square stock may be welded or otherwise secured to the free end of the side rails, for permanently fixing the forward end of each side rail relative to the other and to provide a pair of overhanging anchorage ears or lugs 28 and 29.

The top and bottom faces D and E of bar 127 are preferably parallel with the mean plane of rack 20, as hereinafter more fully explained. Suitable transverse straps may be provided for interconnecting the side elements 19 at spaced intervals, as shown.

Two pair of coupling brackets or bearings are provided for mounting the rack to the truck body, a forward pair comprising brackets 30 and 31, and a rear pair comprising brackets 32 and 33.

It should be observed that each of the brackets comprising the forward pair are provided with a keyhole shaped aperture 34, having a substantially circular portion 35 and a contiguous communicating slot 36 which extends forwardly, that is to the left, and in substantial parallelism with the longitudinal axis of the side rails 10 and 11. Each of the forward bracket members are of identical construction except for the fact that a vertical passageway 37 is provided in communication with the circular portion of the aperture 34 of bracket member 30, as shown.

It should further be observed that each of the brackets comprising the rear pair are provided with a substantially circular aperture 38. Brackets 32 and 33 differ only in that bracket 32 is provided with a vertical slot 39 in communication with aperture 38.

In the preferred embodiment of the invention, the brackets comprising the forward pair are bolted or otherwise secured one each to the forward inner side of a side rail adjacent to the lower end of blade 18. In a similar manner the rear brackets are secured one each to the inner side of each side rail beyond, that is to the rear of, the last transverse spacer element 16, as shown in Figs. 2 and 6.

When the rack is associated with the front pair of coupling brackets 30 and 31, the rack is adapted to assume either of the two positions A or B. Rack 20 is adapted to be associated with the forward pair of coupling brackets while being suspended vertically from transverse end element 25 whereby anchorage lug 29 may be laterally inserted into the circular apertured portion 35 of bracket member 31, after which anchorage lug 28 may be vertically lowered into the aperture portion of bracket 30 via passageway 37. It should be noted that by providing faces D and E of the anchorage lugs in parallelism with the plane of side frame elements 21 and 22, the rack may be secured to the truck brackets while hanging vertically while being supported from transverse end element 25, whereby an operator need only use one hand to connect or disconnect the rack to the frame of the truck.

In Fig. 1, the rack is shown resting flatly upon the body of the truck in position A, this being the lowered or inoperative position of the rack. It should be observed that when the truck body is lifted or inclined for use, as illustrated in Fig. 1, rack 20 will shift or gravitate forward by its own weight to dispose anchorage lugs 28 and 29 within the slotted portions 36 of brackets 30 and 31. When the anchorage lugs are thus disposed within slots 36, as illustrated by the broken lines 28A and 29A of Fig. 4, the rack is fixed relative to the truck body and rotation about the anchorage lugs is prevented. In this manner the rack is locked in an inoperative position whereby the rack cannot become accidentally dislodged or displaced from the truck when the truck wheels strike or encounter an obstruction on the surface over which the truck is being operated. The rack is likewise prevented from clattering and bouncing against the truck side rails 10 and 11 when the truck is being moved about in an unloaded or empty condition.

It should be observed that although the rack is locked against rotation when in position A, an operator may easily disengage the latching connection indicated at 28A and 29A of Fig. 4 by retracting the rack a short distance toward the truck handles 12, whereby the anchorage lugs 28 and 29 are disposed within the circular aperture portion 35 of their respective brackets. From this position the rack may be swung to position B illustrated in Fig. 1.

In position B, Fig. 1, the rack is shown extending forwardly and upwardly against the blade 18, this being the operative position of the rack when the truck is used to transport a plurality of small but comparatively light articles. When the rack is in position B, the anchorage lugs 28 and 29 will assume the relationship with their respective brackets 30 and 31 as indicated by the broken lines 28B and 29B, Fig. 4.

It should be observed that when the rack is disposed in position B the U-shaped channel or recess 40, provided in the rear end of the rack, is disposed at the outer elevated end thereof where it is made available to facilitate the transportation of long unwieldy articles such as lengths of pipe, rods and the like. Rods and other long articles loaded on top of the other freight disposed on the truck bed are prevented from rolling or sliding off of the elevated rack bar by reason of being positioned within said recessed portion.

It should be observed that the rack when in positions A and B, cannot be lifted or detached from the truck body since the anchorage lug 28 is not in registry or alignment with the vertical passageway 37 of bracket 30, and anchorage lug 29 is disposed within the closed aperture 34 of bracket 31. In order to effect a removal, the rack must be swung or moved relative to bracket 30 until the parallel faces D and E of anchorage lug 28 are in register with passageway 37, so as to permit the anchorage lug to be lifted upwardly through said passageway. After lug 28 has thus been disconnected from bracket 30 it is a simple matter to shift the rack laterally of the truck to disengage the lug 29 from aperture 34 of bracket 31.

It should be appreciated that rack 20 cannot be accidentally displaced from the truck since it requires three simple, yet deliberate, operations on the part of the operator to effect a removal;

viz., (1) align the anchorage lug of the bracket having the vertical passageway with said passageway, (2) lift said lug upwardly therethrough and (3) shift the rack laterally of the truck to disengage the other lug from its bracket.

It should be observed that at certain times it may be desirable to detach the rack from the truck body to facilitate handling of a number of large articles which completely cover the bed of the truck, in order to eliminate the weight of the rack on each trucker's trip.

In position C, Figs. 1 and 6, the rack is illustrated associated with the truck body in reversed position with the anchorage lugs engaging the rear pair of brackets 32 and 33, and with the rear end of the rack resting upon the upper portion of blade 18. In the preferred embodiment of the invention the transverse end element 25 is adapted to rest upon blade 18. This rack position permits large pieces of merchandise, such as furniture, refrigerators and the like, to be transported without being injured, cut, penetrated or otherwise damaged by the blade 18, since the transverse end element 25 prevents the article from making physical contact with the blade of the truck.

It should be observed that the rack is not adapted to be locked in any particular position when associated with the rear pair of brackets. Anchorage lug 29 is adapted to be lowered into aperture 38 via passageway 39 after lug 28 has been properly seated within its aperture 38 of bracket 33. The relative position assumed by lugs 28 and 29 with their respective bracket apertures 38, when in position C, is indicated by the broken lines 28c and 29c of Fig. 5.

It should be understood that the width of each of the parallel faces of the anchorage lugs is but slightly less than the width of the vertical bracket passageways 37 and 39, and the width of the horizontal slots 36. Likewise the width of slots 36 and vertical passageways 37 and 39 is substantially less than the diameter of the circular apertured portions 36 and 38.

In some instances it may be desirable to bend or turn the free ends of the rack side elements 21 and 22 outwardly to form projecting anchorage lugs 128 and 129, as illustrated in Fig. 7. It should be understood that in lieu of thus bending the side elements to provide anchorage lugs, each lug may comprise a short length of rectangular or square stock welded or otherwise secured to the free ends of said side elements. It should also be noted that when the rack structure of Fig. 7 is used, a reinforcing bar 227 may be disposed intermediate the side elements as shown. This construction permits the rack, when in reversed position C to be anchored to rear coupling brackets disposed on the inner sides of the truck side rails intermediate the spacer elements 16, as indicated by the broken lines Fig. 2. Bar 227 is adapted to extend laterally across the truck bed above the longitudinal bars 17.

In some instances, therefore, it may be desirable to bend or turn the free ends of the rack elements 21 and 22 outwardly to form anchorage lugs integral therewith in lieu of using a bar such as 127.

From the foregoing, it is apparent that I have provided a detachable rack structure for a warehouse truck which may be quickly and easily associated therewith, and which may be locked in an inoperative position thereon against clattering and unintentional displacement. I have likewise provided compact coupling brackets which are carried on the inner rail faces whereby no part of the truck or rack, on which articles could catch, overhangs the side plane of the truck side rails. It should also be noted that by reason of the recessed channel 40 provided in the rear end of the rack, the utility of the rack has been greatly enhanced without increasing the cost or the weight thereof.

Although the term warehouse truck is used throughout the application, it should be understood that the term is merely exemplary, and that it is meant to include all wheeled or sled type trucks or carriages which may be equipped with the hereinabove described rack.

It should be understood that various changes in the structural details of the truck and rack may be made, within the scope of the appended claims, without departing from the spirit of the invention.

What is claimed is:

1. A detachable rack adapted for association with a trucking device, said trucking device comprising a pair of parallel spaced side rails having coupling brackets mounted one each to the inner side of each of said side rails, said rack being adapted to be removably mounted upon and pivotally supported by said trucking device and comprising a U-shaped structure bent from a single piece of metal to form a pair of parallel side elements and an end member, a recessed portion being provided in said end member disposed in the mean plane of the rack, and outturned anchorage lugs on the free end of each side element and projecting outwardly therefrom adapted for engagement with said coupling brackets for supporting said rack in one or more operative positions on said device.

2. A detachable rack adapted for association with a trucking device comprising a pair of spaced side rails having coupling brackets mounted to the inner face of each rail, said rack being adapted to be removably mounted upon said trucking device for movement to raised operative and lowered inoperative positions, said rack comprising a substantially one-piece U-shaped structure comprising a pair of parallel side elements, the rear end of each of which are turned inward and back to form an inturned loop the adjacent legs of which are interconnected by a transverse end element disposed at substantially right angles to the side elements and being spaced inwardly from a line through the outer edge of said loops to provide an inwardly disposed U-shaped recessed portion intermediate the rear ends of the side elements, each side element being adapted to rest upon a truck side rail when the rack is in a lowered inoperative position, the forward or free end of each rack side element being turned inwardly and then downwardly out of the plane of the rack and terminating in an outwardly projecting extension adapted to engage a coupling bracket, and one or more transverse straps interconnecting the spaced side elements, of the rack intermediate their length.

3. A detachable rack adapted for association with a truck body comprising a pair of spaced side rails having an extending blade thereon, said rack being adapted to be removably mounted upon said truck body with the read end thereof secured to the side rails and with the forward end thereof disposed on and overhanging the blade, coupling brackets mounted on the inner face of each side rail remote from the blade, said rack comprising a U-shaped structure comprising an end and a pair of spaced substantially parallel side elements, said end element being deformed to provide a U-shaped recessed portion disposed in the mean plane of the rack side elements, the free end of each side element being turned inwardly and then downwardly out of the mean plane of the rack to terminate in an outturned anchorage lug adapted for pivotal engagement with a coupling bracket, the bottom portion of the U-shaped recessed portion adapted to rest upon and make line contact with said blade when the rack is lowered onto said blade to provide a flat supporting surface intermediate the blade edge and truck body.

JAMES T. EARLE.